US009977980B2

(12) United States Patent
Joshi et al.

(10) Patent No.: US 9,977,980 B2
(45) Date of Patent: *May 22, 2018

(54) FOOD LOGGING FROM IMAGES

(71) Applicant: Microsoft Technology Licensing, LLC, Redmond, WA (US)

(72) Inventors: Neel Suresh Joshi, Seattle, WA (US); Siddharth Khullar, Seattle, WA (US); T Scott Saponas, Redmond, WA (US); Daniel Morris, Bellevue, WA (US); Oscar Beijbom, La Jolla, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/489,267

(22) Filed: Apr. 17, 2017

(65) Prior Publication Data

US 2017/0323174 A1 Nov. 9, 2017

Related U.S. Application Data

(63) Continuation of application No. 14/179,101, filed on Feb. 12, 2014, now Pat. No. 9,659,225.

(51) Int. Cl.
*G06K 9/00* (2006.01)
*G06K 9/34* (2006.01)
(Continued)

(52) U.S. Cl.
CPC ....... *G06K 9/344* (2013.01); *G06F 17/30247* (2013.01); *G06K 9/00* (2013.01); *G06Q 50/12* (2013.01); *G06K 2209/17* (2013.01)

(58) Field of Classification Search
CPC combination set(s) only.
See application file for complete search history.

(56) References Cited

U.S. PATENT DOCUMENTS 8,345,930 B2 * 1/2013 Tamrakar ............ G06T 7/0002
  382/110
8,725,545 B2 * 5/2014 Phalake ................ G06Q 10/06
  235/385
(Continued)

OTHER PUBLICATIONS

Aizawa, et al., "Food Balance Estimation by using Personal Dietary Tendencies in a Multimedia Food Log", In IEEE Transactions on Multimedia, vol. 15, Issue 8, Dec. 2013, 10 pages.
(Continued)

*Primary Examiner* — Anand Bhatnagar
(74) *Attorney, Agent, or Firm* — Lyon & Harr, LLP; Mark A. Watson

(57) ABSTRACT

A "Food Logger" provides various approaches for learning or training one or more image-based models (referred to herein as "meal models") of nutritional content of meals. This training is based on one or more datasets of images of meals in combination with "meal features" that describe various parameters of the meal. Examples of meal features include, but are not limited to, food type, meal contents, portion size, nutritional content (e.g., calories, vitamins, minerals, carbohydrates, protein, salt, etc.), food source (e.g., specific restaurants or restaurant chains, grocery stores, particular pre-packaged foods, school meals, meals prepared at home, etc.). Given the trained models, the Food Logger automatically provides estimates of nutritional information based on automated recognition of new images of meals provided by (or for) the user. This nutritional information is then used to enable a wide range of user-centric interactions relating to food consumed by individual users.

20 Claims, 4 Drawing Sheets

Recognizing Meals and Food Items from Meal Images

(51) Int. Cl.
G06Q 50/12 (2012.01)
G06F 17/30 (2006.01)

(56) References Cited

U.S. PATENT DOCUMENTS

| | | | |
|---|---|---|---|
| 9,053,483 B2* | 6/2015 | Geisner | G06Q 30/00 |
| 2002/0027164 A1 | 3/2002 | Mault et al. | |
| 2009/0110239 A1* | 4/2009 | Chen | G06T 15/205 382/103 |
| 2010/0136508 A1* | 6/2010 | Zekhtser | G09B 19/0092 434/127 |
| 2011/0318717 A1* | 12/2011 | Adamowicz | G09B 19/0092 434/127 |
| 2012/0094258 A1 | 4/2012 | Langheier et al. | |
| 2013/0051687 A1* | 2/2013 | Kuroki | G06F 17/30265 382/224 |
| 2013/0260345 A1* | 10/2013 | Puri | G09B 19/0092 434/127 |
| 2013/0273509 A1 | 10/2013 | Mutti | |
| 2013/0289886 A1* | 10/2013 | Ricks | G06F 19/3475 702/19 |
| 2013/0300748 A1* | 11/2013 | Yaeda | G06T 11/00 345/467 |
| 2013/0304529 A1 | 11/2013 | Phalake et al. | |
| 2014/0104385 A1* | 4/2014 | Wong | G06Q 10/10 348/46 |
| 2014/0119614 A1 | 5/2014 | Mochizuki et al. | |
| 2014/0133704 A1* | 5/2014 | Iizaka | G06K 9/00671 382/103 |
| 2014/0147829 A1 | 5/2014 | Jerauld | |
| 2015/0132722 A1 | 5/2015 | Menczel et al. | |

OTHER PUBLICATIONS

Beijbom, et al., "Automated Annotation of Coral Reef Survey Images", In IEEE Conference on Computer Vision and Pattern Recognition, Jun. 16, 2012, 8 pages.
Burke, et al., "Self-Monitoring in Weight Loss: A Systematic Review of the Literature", In Journal of the American Dietetic Association, Jan. 2011, 17 pages.
Chen, et al., "Automatic Chinese Food Identification and Quantity Estimation", In Proceedings of SIGGRAPH Asia Technical Briefs, Nov. 28, 2012, 4 pages.
Chen, et al., "PFID: Pittsburgh Fast-Food Image Dataset", In Proceedings of the 16th IEEE International Conference on Image Processing, Nov. 7, 2009, 4 pages.
Chen, et al., "Toward Dietary Assessment via Mobile Phone Video Cameras", In Proceedings of American Medical Informatics Association Annual Symposium, Nov. 13, 2010, 6 pages.
Dalal, et al., "Histograms of Oriented Gradients for Human Detection", In IEEE Computer Society Conference on Computer Vision and Pattern Recognition, vol. 1, Jun. 25, 2005, 8 pages.
Fan, et al., "Liblinear: A Library for Large Linear Classification", In Journal of Machine Learning Research, vol. 9, Jun. 1, 2008, 4 pages.
Flegal, et al., "Prevalence and Trends in Obesity Among US Adults", In Journal of the American Medical Association, Jan. 20, 2010, 7 pages.
Gao, et al., "HealthAware: Tackling Obesity with Health Aware Smart Phone Systems", In IEEE International Conference on Robotics and Biomimetics, Dec. 19, 2009, 6 pages.
Hollis, et al., "Weight Loss During the Intensive Intervention Phase of the Weight-Loss Maintenance Trial", In American Journal of Preventive Medicine, Aug. 2008, 9 pages.
Khan, et al., "Discriminative Color Descriptors", In IEEE Conference on Computer Vision and Pattern Recognition, Jun. 23, 2013, 8 pages.

Khosla, et al., "Memorability of Image Regions", In 26th Annual Conference on Neural Information Processing Systems, Dec. 2012, 9 pages.
Kong, et al., "Dietcam: Automatic dietary assessment with mobile camera phones." in Pervasive and Mobile Computing, vol. 8, Issue 1, Feb. 2012, 17 pages.
Lowe, David G., "Object Recognition from Local Scale-Invariant Features", In Proceedings of the International Conference on Computer Vision, vol. 2, Sep. 1999, 8 pages.
Miyazaki, et al., "Image-based Calorie Content Estimation for Dietary Assessment", In IEEE International Symposium on Multimedia, Dec. 11, 2013, 6 pages.
Noronha, et al., "Platemate: Crowdsourcing Nutritional Analysis from Food Photographs", In Proceedings of the 24th Annual ACM Symposium on User Interface Software and Technology, Oct. 16, 2011, 11 pages.
Ojala, et al., "Multiresolution Gray-Scale and Rotation Invariant Texture Classification with Local Binary Patterns", In IEEE Transactions on Pattern Analysis and Machine Intelligence, vol. 24, Issue 7, Jul. 2002, 17 pages.
Shang, et al. "Dietary intake assessment using integrated sensors and software." in Proc. SPIE 8304, Multimedia on Mobile Devices 2012; and Multimedia Content Access: Algorithms and Systems VI, 830403 (Feb. 1, 2012).
Sivic, et al., "Video Google: A Text Retrieval Approach to Object Matching in Videos", In Proceedings of the Ninth IEEE International Conference on Computer Vision, vol. 2, Oct. 13, 2003, 8 pages.
Svetkey, et al., "Comparison of Strategies for Sustaining Weight Loss: The Weight Loss Maintenance Randomized Controlled Trial", In Journal of the American Medical Association, vol. 299, Issue 10, Mar. 12, 2008, 10 pages.
Varma, et al., "A Statistical Approach to Texture Classification from Single Images", In International Journal of Computer Vision—Special Issue on Texture Analysis and Synthesis, vol. 62, Issue 1-2, Apr. 1, 2005. 34 pages.
Villalobos, et al., "A Personal Assistive System for Nutrient Intake Monitoring", In Proceedings of International ACM Workshop on Ubiquitous Meta User Interfaces, Dec. 1, 2011, 6 pages.
Wang, et al., "Locality-Constrained Linear Coding for Image Classification", In IEEE Conference on Computer Vision and Pattern Recognition, Jun. 13, 2010, 8 pages.
Wu, et al., "Fast Food Recognition from Videos of Eating for Calorie Estimation", In IEEE International Conference on Multimedia and Expo, Jun. 28, 2009, 4 pages.
Yang, et al., "Food Recognition Using Statistics of Pairwise Local Features", In IEEE Conference on Computer Vision and Pattern Recognition, Jun. 13, 2010, 8 pages.
Young, et al., "The Contribution of Expanding Portion Sizes to the US Obesity Epidemic", In American Journal of Public Health, vol. 92, Issue 2, Feb. 2002, 4 pages.
Zepeda, et al., "Think before you eat: photographic food diaries as intervention tools to change dietary decision making and attitudes." International Journal of Consumer Studies (2008).
Zhu, et al., "The Use of Mobile Devices in Aiding Dietary Assessment and Evaluation", In IEEE Journal of Selected Topics in Signal Processing, vol. 4, Issue 4, Aug. 2010, 11 pages.
Bhatnagar, Anand P., U.S. Office Action, U.S. Appl. No. 14/179,101, filed Aug. 13, 2015, pp. 1-16.
Bhatnagar, Anand P., U.S. Office Action, U.S. Appl. No. 14/179,101, filed Feb. 25, 2016, pp. 1-14.
Bhatnagar, Anand P., U.S. Final Office Action, U.S. Appl. No. 14/179,101, filed Sep. 8, 2016, pp. 1-6.
Bhatnagar, Anand P., U.S. Notice of Allowance, U.S. Appl. No. 14/179,101, filed Jan. 17, 2017, pp. 1-9.

* cited by examiner

FOOD LOGGING FROM IMAGES

CROSS-REFERENCE TO RELATED APPLICATIONS

This application is a Continuation application of U.S. patent application Ser. No. 14/179,101, filed on Feb. 12, 2014 by Joshi, et al., and entitled "RESTAURANT-SPECIFIC FOOD LOGGING FROM IMAGES," and claims priority to U.S. patent application Ser. No. 14/179,101 under Title 35 U.S.C., § 120.

BACKGROUND

Food logging, i.e., monitoring food eaten by individuals along with various nutritional information associated with that food, is becoming increasing popular for a variety of reasons. For example, obesity has been linked to conditions such as cardiovascular disease, diabetes, and cancer, and dramatically impacts both life expectancy and quality of life. Furthermore, the rapid rise in the prevalence of obesity presents a critical public health concern. While diet and exercise have been shown to be central to combating obesity, changes in a person's diet and exercise habits are often difficult. However, it has been shown that the use of exercise in combination with accurate food logging supports such changes. Further, food logging is known to be well-correlated to increased initial weight loss and improved weight maintenance.

Unfortunately, food logging is often performed as a fully or partially manual process, with the result that the effectiveness of food logging is often limited by inconvenience to the user. Attempts to perform automatic food logging, based on inferring nutritional information from a single food image, have shown generally poor performance due to a variety of reasons. For example, there may be significant occlusions (e.g., a sausage hidden under a side of coleslaw) in a food image, resulting in missing information. Further, it is highly unlikely that visual information alone conveys all the details of food preparation (e.g., amount of oil, fat content of meats, sugar content, salt content, etc.) that strongly impacts nutritional content. In addition, accurate volume estimation from a single image remains a challenging computational task.

In light of such issues, effective techniques for estimating nutritional statistics (e.g., calories, fats, carbohydrates, etc.) from single images of realistic meals present challenging problems. One existing attempt to address such issues relaxes the single-image assumption and utilizes auxiliary hardware such as calibration targets, multiple images, laser scanners, and structured light. Further, such techniques generally assume unrealistic arrangements of the food items on a plate in a manner that allows each individual item to be clearly imaged. Unfortunately, techniques requiring users to provide food images using various combinations of calibration targets, multiple images, laser scanning, careful arrangement of food items on a plate, etc. before consuming a meal are not generally considered to be "user friendly."

Additional attempts to address some of the aforementioned challenges provide techniques that relax the goal of estimating nutritional statistics, while instead focusing on core computer vision challenges. For example, one approach suggests the use of a feature descriptor but evaluates only on the highly controlled "Pittsburgh Fast-Food Image Dataset" (also referred to as the "PFID"). Another approach considers the use of user-supplied images and nutritional statistics to bootstrap classification. This approach utilizes a nutritional table with five categories: grain, vegetable, meat/fish/beans, fruit, and milk. Images are mapped to these categories and serving sizes are then supplied by the user. Unfortunately, such works are limited by the granularity of the nutritional table and portion sizes. In particular, the coarse nutritional information used in such approaches carries large standard deviations of serving counts, preventing accurate calorie estimation. Yet another approach considers manual crowd-sourced assessments of nutritional information based on images of food being consumed. This crowd-sourced approach has been observed to show results similar to those supplied by a dietitian, but at the cost of significant human input and delay in feedback to the person consuming the meal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Food Logger," as described herein, provides various approaches for learning or training one or more image-based models (referred to herein as "meal models") of nutritional content of meals. Note that in various embodiments, meal images used to construct the meal models are included in, or associated with, one or more of the meal models to allow users to browse meal images and associated nutritional information via a user interface component of the Food Logger. Training of meal models is based on one or more datasets of images of meals in combination with "meal features" that describe various parameters of the meal. Examples of meal features include, but are not limited to, food type, meal contents, portion size, nutritional content (e.g., calories, vitamins, minerals, carbohydrates, protein, salt, etc.), food source (e.g., specific restaurants or restaurant chains, grocery stores, particular pre-packaged foods, school meals, meals prepared at home, etc.), ingredients, etc. In the event that source or location of meals is known, the meal model may include source-specific classifiers that can be used to constrain recognition based on particular sources or locations.

Given the trained model, the Food Logger automatically provides estimates of nutritional information based on new images of meals provided by (or for) the user. In various embodiments, a user interface component of the Food Logger provides capabilities to add, remove, or modify any parameters (e.g., portion size, plate size, side dishes, drinks, etc.) used to estimate nutritional content of particular meals being consumed by the user. Similarly, condiments, such as where the user adds a tablespoon of butter to a baked potato, can also be specified via the user interface. The resulting nutritional information is then used to enable a wide range of user-centric interactions relating to food consumed by individual users.

In other words, the Food Logger generally operates by using one or more initial catalogues, sets, or databases of training images of some range of meals. These meals can include any combination of individual food items (e.g., hamburger, chicken, potato, beans, cake, candy, etc.), full meals (e.g., a Chinese meal of chicken, rice, and snow peas, with sides of an eggroll and soup), and drinks (e.g., beer, wine, soda, juice, milk, water, etc.). Each training image is associated with various meal features (or labels) that, when combined with the image, represents a labeled example that is provided as input to train each meal model. Further, meal models can be trained on image sets specific to one or more particular sources (e.g., particular restaurants, home cooked meals, school meals, etc.).

Given the labeled examples (i.e., meal image plus meal features), a machine learning component of the Food Logger uses any desired machine learning technique to learn or train the aforementioned meal models. The resulting meal models are then provided for use in a run-time food logging component of the Food Logger. In particular, the resulting meal models are used for recognizing and logging food of individual users based on one or more current meal images for each user. These current meal images are either captured by the user (e.g., camera, cell phone, head worn eyeglasses with one or more cameras or imaging devices, etc.), or captured via one or more cameras or imaging devices positioned to automatically capture images of food items of complete meals to be consumed by the user.

Further, in various embodiments, recognition of current meal images to determine nutritional content is performed locally by executing the run-time food logging component of the Food Logger on a smart phone or other mobile or local computing device associated with one or more users. In related embodiments, recognition of one or more current meal images is provided as a remote service in response to receipt of copies of users' current meal images. This allows the run-time food logging component of the Food Logger to operate as a remote, or partially remote, instantiation to determine nutritional content of meals being consumed by one or more users. Further, images of meals consumed by the user over some period of time, e.g., daily, weekly, etc., can be stored by the user (e.g., on a cell phone or camera), and then periodically evaluated (locally or remotely) to determine nutritional content for the multiple meals consumed over that time period.

Note that with respect to particular restaurants, school meals, etc., in various embodiments, a location determination component of the Food Logger uses various automated tracking or localization techniques (e.g., GPS, cell-tower based localization, RFID, etc.), or user specification of current location (e.g., typing restaurant name, using speech input, selecting from a list of favorite restaurants, etc.), to determine where the user is when the meal image is provided for recognition. This can be used to constrain the meal recognition question to components of the meal model associated with particular restaurants or other particular locations, thereby simplifying the recognition process. In other words, when the Food Logger determines, for example, that the user is at the "Solo Grill" on King Street in Toronto, Canada, the Food Logger then constrains the meal image recognition process to nutritional information in the meal model for meals identified as originating from the Solo Grill.

Another advantage of restaurant-specific meal recognition is that it is not necessary for the Food Logger to identify every food item in a meal image. In other words, knowing the menu at a particular restaurant allows the Food Logger to use the meal model to perform a holistic assessment of the plate where occlusions (e.g., a sausage hidden under a side of coleslaw) are no longer a concern. In particular, determining the restaurant allows the Food Logger to recognize the overall meal and corresponding nutritional information from whatever elements of the meal are visible in the meal image, whether or not additional elements of the meal are occluded in the meal image. However, it should be understood that the Food Logger is fully capable of separately recognizing multiple individual food items in a single meal image by simply training one or more of the meal models on individual food items.

Further, by considering the meal as a whole entity on a per-restaurant basis, additional information such as ingredients (e.g., peanut sauce, shell fish, etc.) and preparation details (e.g., baked, fried, poached, etc.) can be encoded into the meal model along with corresponding nutritional information. Finally, constructing meal models that are expressly trained on meal images and nutritional information on a per-restaurant basis can, in many cases, eliminate any need to perform volume estimation from current meal images for users since meal and portion sizes are generally consistent from serving to serving at particular restaurants.

Advantageously, text menus describing particular meals for most restaurants are generally easily available from a wide variety of online sources, e.g., sites such as Yelp® or Foursquare.com, or individual restaurants' websites. Further, a high percentage of such text menus also include nutritional information (typically caloric content, at least, and often additional nutritional information). Note also that if not available in combination with the menu, estimates of nutritional information for use in constructing labeled examples for training meal models can be hand-coded, crowd-sourced, estimated based on similar meals from other restaurants or sources, etc.

Consequently, even where meal images from a particular restaurant are not available for use in model training, meal descriptions and corresponding nutritional content is generally available from multiple sources, as noted above. Therefore, in the case where images of particular meals for particular restaurants are not available, the Food Logger performs automated online searches for images corresponding to each menu item for the particular restaurant. For example, if the restaurant menu includes grilled chicken sandwiches, the Food Logger can obtain multiple images of grilled chicken sandwiches from arbitrary online sources for use in training meal models.

Once nutritional content of meals being consumed by the user has been estimated by using one or more meal models to evaluate current meal images, the nutritional information is then made available for a number of uses. Such uses include, but are not limited to, monitoring or logging caloric intake, monitoring or logging other nutritional intake (e.g., carbohydrates, protein, specific vitamins and minerals, fiber, etc.), suggesting food items to help balance the user's diet (e.g., suggest that the user eat more fruit and vegetables after consuming a large steak), etc. Historical records of nutritional information (and associated meal images) for users can also be maintained, and accessed by the user as any combination of numerical, graphical, and meal image data, for any desired period of time.

In view of the above summary, it is clear that the Food Logger described herein provides various approaches for using trained meal models to recognize food from meal images and to estimate nutritional information of the recognized food for use in a wide range of applications. In addition to the benefits summarized above, other advantages of the Food Logger will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
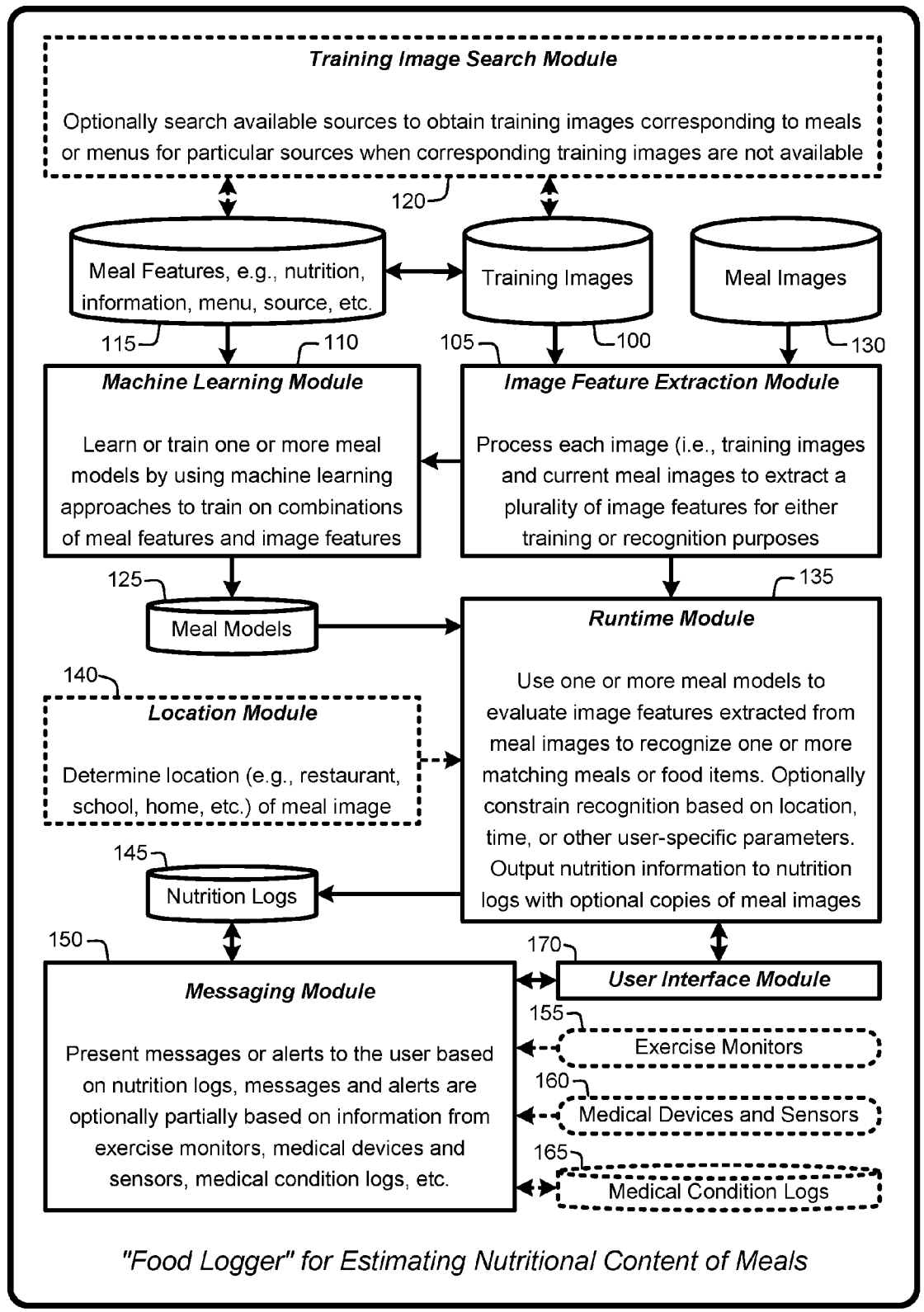
FIG. 1 provides an exemplary architectural flow diagram that illustrates program modules for implementing various embodiments of a "Food Logger" that uses trained meal models to recognize food from meal images and estimate nutritional information of the recognized food, as described herein

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Food Logger," as described herein, provides various approaches for using trained meal models to recognize food from meal images and to estimate nutritional information of the recognized food for use in a wide range of applications. Note that in various embodiments, meal images used to construct the meal models are included in, or associated with, one or more of the meal models to allow users to browse meal images and associated nutritional information via a user interface component of the Food Logger. While the meal models described herein can be trained using any of a wide range of data sources, in various embodiments, one or more of the meal models constructed by the Food Logger focus on the restaurant or "eating out" scenario based on the observation that restaurant meals are typically visually and nutritionally similar across many servings and potentially many photographs. This allows the Food Logger to use image recognition to label food and estimate calories (and other nutritional information) given an existing set of known food items, i.e., a menu.

More specifically, the information used to estimate calories or nutritional values for meals are is referred to as "features" or "labels", e.g., food name, restaurant location (or restaurant chain identification) or food source, item size, calories, vitamins, iron, etc., that are associated with one or more exemplary images of particular types of meals. The combination of these features and corresponding images are provided as labeled examples to train one or more meal models. Once the meal models have been trained, the Food Logger focuses on identifying the food items on the plate using one or more meal models. That recognition is then used to estimate corresponding nutritional information from the meal model.

In the event that source or location of meals is known, the meal model may include source-specific classifiers that can be used to constrain recognition based on particular sources or locations. Advantageously, by using tracking or localization techniques to determine which restaurant or location the user is at, the recognition space is constrained to the identified location, and to meals served at the identification location. Note also that restaurant location or meal source can be manually specified or selected by the user (e.g., typing restaurant name, using speech input, selecting from a list of favorite restaurants, etc.). Consequently, instead of trying to segment meal images into constituent food items, e.g., this this part of the image is green beans, and this part is chicken, the Food Logger instead recognizes the meal as a whole, thereby avoiding problems of food item segmentation and food items being occluded in the meal image. However, it should be understood that the Food Logger is fully capable of separately recognizing multiple individual food items in a single meal image by simply training one or more of the meal models on individual food items.

Current meal images of meals to be consumed by the user are either captured by the user (e.g., camera, cell phone, head worn eyeglasses with one or more cameras or imaging devices, etc.), or captured via one or more cameras or imaging devices positioned to automatically capture images of food to be consumed by the user. Note that in various embodiments, the user does not need to explicitly trigger image capture. For example, if the user is wearing camera-enabled glasses of some sort, or if a camera is positioned relative to the user to capture meal images on behalf of one or more users, then the Food Logger can scan (e.g., periodically, when triggered by the user, after entering a restaurant, etc.) for images of food presented to the user for consumption. Note also that in various embodiments, post-meal images of the food can also be compared to pre-meal images of that food to allow the Food Logger to estimate a percentage or fraction of the meal actually consumed by the user. This allows the Food Logger to update nutritional estimates of food actually consumed by the user when the meal is only partially consumed.

Further, in any particular meal, there are typically several food items in a single image of that meal, e.g., a side of bread next to soup, or a serving of curry along with a bowl of rice and naan. In the case that a restaurant associated with a meal image is identified by the Food Logger, this enables identification of the overall meal, which in turn enables accurate prediction or estimation of nutritional content.

In the case of meals, side dishes, or condiments, or other cases where serving sizes and ingredients vary by customer, such as salad bars, bread, butter, etc., various embodiments of the Food Logger provide a user interface that allows the user to input estimates of type and size of one or more such food items. The Food Logger can then use this additional user-provided information to supplement nutritional information derived from any meal images. Further, the user interface allows the correct or edit recognitions or corresponding nutritional information. For example, if the Food Logger does not correctly recognize a particular meal image the user can interact with the user interface to manually correct or update the information for that meal image. The Food Logger can then log that information for various uses (e.g., calorie count, nutritional tracking, etc.) and also update the meal model for recognizing that food item (or multiple items on the plate) when similar meal images are submitted for future recognitions.

Note also that one or more meal models can be updated or trained to account for home cooking to construct user-specific databases of home cooked or pre-made meals. Further, updated models can be downloaded or otherwise provided for use by mobile or local devices of individual users at any time. In addition, rather than performing recognition locally, user's device can be sent by user's device to remote recognition service which returns recognition results and then allows user to correct or update meal elements, as described herein.

Note also that calories in meals are not necessarily the final output of the Food Logger, or even what restaurant the user was in or where the food came from. For example, in various embodiments, the final output could be used exclusively for allergy detection, where all that matters is that the system recognizes a food item from any source that, per one or more meal models, is recognized as a food that is likely to contain a peanut sauce, for example, when the user is known to be allergic to peanuts.

1.1 System Overview:

As noted above, the Food Logger provides various approaches for using meal models trained via one or more machine-learning techniques to recognize food from meal images and to estimate nutritional information of the recognized food for use in a wide range of applications. The processes summarized above are illustrated by the general system diagram of FIG. 1. In particular, the system diagram of FIG. 1 illustrates the interrelationships between program modules for implementing various embodiments of the Food Logger, as described herein. Furthermore, while the system diagram of FIG. 1 illustrates a high-level view of various embodiments of the Food Logger, FIG. 1 is not intended to provide an exhaustive or complete illustration of every possible embodiment of the Food Logger as described throughout this document.

In addition, it should be noted that any boxes and interconnections between boxes that may be represented by broken or dashed lines in FIG. 1 represent alternate embodiments of the Food Logger described herein, and that any or all of these alternate embodiments, as described below, may be used in combination with other alternate embodiments that are described throughout this document.

In general, as illustrated by FIG. 1, the processes enabled by the Food Logger begin operation by providing plurality of training images 100 to an image feature extraction module 105. The image feature extraction module 105 process each training image 100 to extract a plurality of image features for use in training one or more meal models 125. Examples of features extracted from images include, but are not limited to, color, histogram of oriented gradients (HOG), scale-invariant feature transforms (SIFT), local binary patterns (LBP), texton histograms, etc. Note that a detailed examples of image feature extraction is provided below in Section 2.3.

Note also that in cases where restaurant menus, food items, meal descriptions, etc., are available, but corresponding meal images are not available (e.g., restaurant menu and nutritional information available without corresponding meal images), the Food Logger uses an optional training image search module 120 to obtain meal images for use in training meal models 125. In particular, the training image search module 120 optionally searches available sources (e.g., internet image search or search of one or more image databases), to obtain representative training images corresponding to menus or food items for particular sources (e.g., restaurant, school, etc.) when corresponding training images are not available. Images obtained in this manner are provided as training images 100 and processed in the manner described above to extract image features for use in training meal models 125.

The image features extracted from the training images 100 by the image feature extraction module 105 are then provided to a machine learning module 110. In general, as discussed in further detail throughout this document, the machine learning module 110 uses any of a variety of machine learning techniques to learn or train one or more meal models 125 using combinations of image features provided by the image feature extraction module 105 and corresponding meal features 115. In general, each of the training images 100 is associated with one or more corresponding meal features 115. Examples of meal features include, but are not limited to, food type, meal contents, portion size, nutritional content (e.g., calories, vitamins, minerals, carbohydrates, protein, salt, etc.), food source (e.g., specific restaurants, grocery stores, particular prepackaged foods, school meals, meals prepared at home, etc.), ingredients, etc.

Note that in the case that one or more meal features 115 are not available for a corresponding training image 100, in various embodiments, the Food Logger optionally performs an automated search for various meal features that are then associated with corresponding training images. For example, individual food items and meals typically have associated nutritional labels including ingredients, calories, protein, carbohydrates, vitamins, etc. Such information is also available from a wide range of online sources, including, but not limited to, restaurant menus, manufacturer or producer websites, U.S. Department of Agriculture (USDA), etc. Note also that one or more such meal features 115 can be provided via manual input or via manual selection from a set of predefined meal features.

Once one or more meal models 125 have been trained or learned by the machine learning module 110, these models are then made available (either locally or via a remote service or the like) for use by a runtime module 135 of the Food Logger. In general, the runtime module 135 uses one or more meal models 125 to evaluate image features extracted from a user's current meal images 130 to recognize one or more matching meals or food items. Once the runtime module 135 has used the meal models 125 to recognize any meal images 130, the runtime module outputs corresponding nutrition information to nutrition logs 145 or other database along with optional copies of meal images that were recognized.

In various embodiments, the meal image 130 recognition process is optionally constrained based on various factors, including, but not limited to location, time, or other user-specific parameters. In various embodiments, a location module 140 uses various automated tracking or localization techniques (e.g., GPS, cell-tower based localization, RFID, etc.), or manual user selection or input (e.g., typing restaurant name, using voice or speech input, selecting from a list of favorite restaurants, etc.), to determine the particular restaurant or other location where a meal image 130 was captured. Using the resulting locality information to constrain the recognition process allows the runtime module 135 to directly classify or recognize the meal with high confidence relative to the identified restaurant or other location.

In various embodiments, the Food Logger then uses the nutritional information for recognized meals available in the nutritional logs 145 to enable a wide range of applications and user interaction scenarios via a messaging module 150. In general, the messaging module 150 present messages or alerts to the user based on nutrition logs 145. These messages and alerts are optionally partially based on information from exercise monitors 155, medical devices and sensors 160, medical condition logs 165, etc.

Further, a user interface module 170 is provided to enable user interaction with the Food Logger with respect to the nutrition logs 145, various alerts or messages provided by the messaging module 150. In addition, the user interface module can be used for a wide range of additional interactions (not shown in FIG. 1) such as, for example, inputting meal images 130 for current meals being consumed by the user, inputting location (in the event that the optional location module 140 is unable to determine location), entering or updating meal features 115, etc.

2.0 Operational Details of The Food Logger

The above-described program modules are employed for implementing various embodiments of the Food Logger. As summarized above, the Food Logger provides various approaches for using trained meal models to recognize food from meal images and to estimate nutritional information of the recognized food for use in a wide range of applications. The following sections provide a detailed discussion of the operation of various embodiments of the Food Logger, and of exemplary methods for implementing the program modules described in Section 1 with respect to FIG. 1. In particular, the following sections provide examples and operational details of various embodiments of the Food Logger, including:

An operational overview of the Food Logger;
Restaurant-specific food recognition;
Training and recognition framework; and
Additional embodiments and considerations.

2.1 Operational Overview:

Advantageously, by using a large set of training images and corresponding nutritional features to learn meal models, the Food Logger simplifies what would otherwise be a combined image and calorie estimation problem into simply an image recognition problem. More specifically, given an image of a plate of food that includes some combination of food items, the Food Logger recognizes the meal as a whole, rather than the individual items. Then, since the meal model includes nutritional information on a per-meal basis, the Food Logger can estimate the amount of calories of other nutritional information those plates have.

However, it should be understood that by training the meal model on individual food items, the Food Logger is fully capable of separately recognizing multiple individual food items on a plate. More specifically, in various embodiments, the Food Logger calculates the probability of each type of food in the meal image independently. For example, the Food Logger can recognize pizza and garlic bread separately even when those items are on the same plate. The Food Logger can then use any combination of user interaction, knowledge of the menus for nearby restaurants, etc., to determine which individual food items are actually in the meal image. Then, since the meal models trained on individual food items will also include nutritional information on a per-food item basis, the Food Logger can estimate the amount of calories of other nutritional information for the combination of individual food items on a plate.

Advantageously, in various embodiments, the Food Logger uses tracking or localization techniques as a precursor to the recognition process. Therefore, by assuming that meal portions and preparation methods for particular meals are relatively consistent for particular restaurants, recognition of a particular meal corresponding to a particular restaurant (or other known location) allows the Food Logger to estimate nutritional values for the meal being consumed by the user on a per-restaurant basis.

2.2 Restaurant- or Source-Specific Recognition:

Note that the following discussion refers to meal recognition based on specific restaurants or other localities (e.g., school meals, home cooked meals, etc.). However, in view of the discussion provided herein it should be clear that determination of specific locations or restaurants is not a prerequisite to the various meal recognition approaches described throughout this document.

In various embodiments, the Food Logger increases accuracy of estimated nutritional content by framing the meal recognition question in a restaurant-specific format where nutritional information for food items is based on any combination of actual meals, individual food items, condiments, side dishes, and drinks, as they are served at specific restaurants or other locations. Given nutritional information for meals at particular locations in combination with images of the corresponding food, meal models are trained on restaurant-specific datasets that include actual meal images from multiple restaurants. In combination with various automated tracking or localization techniques (e.g., GPS, cell-tower based localization, RFID, etc.), this allows the Food Logger to determine the particular restaurant or other location where a meal image is captured and then to directly classify or recognize the meal with high confidence relative to the identified restaurant or other location.

For example, while many cheeseburger meals look similar, and often include similar sides, such as french-fries, regardless of the particular restaurant, the nutritional content can vary widely between cheeseburger meals from different restaurants. However, by using various automated tracking or localization techniques to first identify the particular restaurant, e.g., GPS indicates user is at the "Solo Grill" on King Street in Toronto, Canada, the Food Logger can then recognize the cheeseburger as being from Solo Grill. This in turn provides increased confidence in the estimate of nutritional statistics provided by the meal model for an image of a cheeseburger meal. Given that, in many restaurants, any given food item is tends to be generally nutritionally consistent from serving to serving, such identification provides an advantageous approach to increased accuracy of nutritional estimates from meal images.

Another advantage of restaurant-specific meal recognition is that it is not necessary for the Food Logger to identify every food item in a meal image. In other words, knowing the menu at a particular restaurant allows the Food Logger to use the meal model to perform a holistic assessment of the plate where occlusions (e.g., a sausage hidden under a side of coleslaw) are no longer a concern. In particular, determining the restaurant allows the Food Logger to recognize the overall meal and corresponding nutritional information from whatever elements of the meal are visible in the meal image, whether or not additional elements of the meal are occluded in the meal image.

Further, by considering the meal as a whole entity on a per-restaurant basis, additional information such as ingredients (e.g., peanut sauce, shell fish, etc.) and preparation details (e.g., baked, fried, poached, etc.) can be encoded into the meal model along with corresponding nutritional information. Finally, constructing meal models that are expressly trained on meal images and nutritional information on a per-restaurant basis can, in many cases, eliminate any need to perform volume estimation from current meal images for users since meal and portion sizes are generally consistent from serving to serving at particular restaurants.

Advantageously, text menus describing particular meals for most restaurants are generally easily available from a wide variety of online sources, e.g., sites such as Yelp® or Foursquare.com, or individual restaurants' websites. Further, a high percentage of such text menus also include nutritional information (typically caloric content, at least, and often additional nutritional information). Note also that if not available in combination with the menu, estimates of nutritional information for use in constructing labeled examples for training meal models can be hand-coded, crowd-sourced, estimated based on similar meals from other restaurants or sources, etc.

Consequently, even where meal images from a particular restaurant are not available for use in model training, meal descriptions and corresponding nutritional content is generally available from multiple sources, as noted above. Therefore, in the case where images of particular meals for particular restaurants are not available, the Food Logger performs automated online searches for images corresponding to each menu item for the particular restaurant. For example, if the restaurant menu includes grilled chicken sandwiches, the Food Logger can obtain multiple images of grilled chicken sandwiches from arbitrary online sources for use in training meal models.

Alternatively, sample meal images for use in training the meal models can be collected either as a top-down database (e.g., a company deploying this system could bootstrap the database by collecting meal image data for restaurants in major cities), or as a bottom-up database (e.g., populated by leveraging prevalent social media use in restaurants, e.g., Yelp, Twitter, Foursquare, Meal Snap, Instagram, direct contributions from participating restaurants, etc.). In either case, images returned by searches or obtained from various databases or other sources are then combined with nutritional information of meals (derived from various sources) to construct labeled examples that are provided as input to train each meal model.

Advantageously, over time, as actual meal images from a particular restaurant are provided for use in recognizing a user's current meal, those meal images can be used to update the corresponding meal models. By using the tracking or localization techniques to determine the location from which meal images are captured, this enables the Food Logger to improve recognition accuracy for meals at particular restaurants over time.

In other words, where menu items are known and images are not available for training data, the system simply pulls a selection of labeled images for each food item from the internet (or other database) for use in training the models. Note also that manual curation of images for use in training models can also be performed. The Food Logger can then update the model with actual images from one or more users captured at the restaurant in question. As such, user's local models for particular restaurants can be updated or evolve over time where users capture images. Further, when users allow captured images to be uploaded to a remote server or database, offline training of models for use by any user can be updated or evolve over time. In either case, models continually improve over time.

Further, in some cases, the Food Logger may be unable to determine a current user location using automated tracking or localization techniques for some reason (e.g., GPS offline or inaccessible). However, if the meal model has been trained, or updated, using actual meal images from particular restaurants, the Food Logger may be able to identify the restaurant based solely on one or more current meal images provided for recognition. In the case of "signature" dishes that are specific to particular restaurants, this recognition scenario becomes easier. For example, if an image of a hamburger shows square patties, there is a high probability that the burger is from a Wendy's® restaurant. In addition, the user can simply enter their present location in the event that the automated tracking or localization techniques are unable to determine the present location.

Consequently, given meal models that are trained on particular restaurants or meals specific to particular locations (e.g., home meals, school meals, etc.), the Food Logger provides a run-time component for meal recognition that restricts the search for a particular image to a small set of restaurants near the location from which current meal images are provided. This greatly simplifies recognition using the trained meal models, while offering a plausible path to robust, accurate mapping of meal images to the nutritional information of the corresponding meals.

Note also that even where a particular restaurant or other food source is not known to the meal model (e.g., new restaurants, different restaurant in same location as an older restaurant, mobile food trucks, etc.), the Food Logger can recognize meal images as being similar to one or more meals in the meal model. The Food Logger can then either output the nutritional information corresponding to the closest match, or can average the nutritional information of some number of the closest matches to the current meal image provided for recognition.

2.3 Training and Recognition Framework:

In general, given the labeled examples (i.e., meal images plus meal features and optional meal source such as, for example, particular schools or restaurants), a machine learning component of the Food Logger uses any desired machine learning technique to learn or train the aforementioned meal models. Examples of machine learning techniques that can be used for this purpose include, but are not limited to, supervised learning based techniques (e.g., artificial neural networks, Bayesian-based techniques, decision trees, etc.), unsupervised learning based techniques (e.g., data clustering, expectation-maximization algorithms, etc.), reinforcement learning based techniques, deep learning based techniques, etc.

Note also that for purposes of explanation, the following discussion provides one detailed example of using particular machine learning techniques to train meal models. However, it should be understood that the Food Logger is not intended to be limited to the exemplary machine learning approach described in the following paragraphs.

For example, in a tested embodiment of the Food Logger, meal model training was performed using an image recognition framework based on a "bag of visual words" machine learning approach. This machine learning approach begins by extracting a plurality of types of base features from meal images (for each class or category). In a tested embodiment, these base features included characteristics such as color, histogram of oriented gradients (HOG), scale-invariant feature transforms (SIFT), local binary patterns (LBP), texton histograms, etc. Note that other features (or more or fewer features) may also be used without departing from the intended scope of the Food Logger described herein.

These extracted base features are then encoded with locality-constrained linear encoding (LLC), using a dictionary learned via k-means clustering. The encoded base features are then pooled using max-pooling in a rotation-invariant pooling process. After pooling, each meal image is represented by multiple feature descriptors (one for each base feature type).

The Food Logger then trains a one-versus-all linear support vector machine (SVM) on each feature type separately. The resulting classifiers are then applied again to the training set yielding a new high-dimensional joint feature vector of concatenated decision values for each training image. A final one-versus-all linear classifier is then trained on this representation. This method of merging feature types is referred to as "late fusion". Note that an evaluation of the efficiency of the individual and fused feature representations discussed above showed that the above-described fusion of multiple feature representations increases recognition accuracy of the meal models constructed by the Food Logger relative to using any individual feature type alone.

Note that since there are often several food items in an image and the Food Logger does not need to leverage any spatial information (e.g., bounding boxes from the labelling process), an image feature vector will often have multiple labels. This is handled during training by using any feature vector with multiple labels as a separate positive sample for each of its corresponding labels. In a tested embodiment, feature extraction from meal images used dictionary sizes set to 1024 for all feature types (though the Food Logger is not limited to this value). Further, the rotation-invariant pooling procedure was done at 5 scales (though more of fewer scales can be used in training, if desired) with the first being the whole image, the second being the largest possible centered square, and the last three being centered square regions, each one smaller than the previous by a power of 2.

At the end of this process, the machine learning component of the Food Logger has a classifier that takes a new meal image provided by, or for, the user and assigns a probability to each food item on a selected set of menus. Because multiple food items may exist in the same image, this may still be one step away from displaying nutritional information to a user, depending on recognition confidence. For example, in an interactive setting, the top k items matching the meal image (e.g., the five closest matches) could be displayed for selection by the user. However, a fully automated method that provides calorie counts (or other nutritional information) and a final list of food items without requiring user selection is also enabled by the Food Logger.

In various embodiments, the Food Logger supplies a final list of food items using a greedy algorithm that leverages a food item co-occurrence matrix and a food item count vector, m, whose entries $m_i$ are the average number of food items that item i co-occurs with. Specifically, let p be a list of food item indexes after sorting the final decision values (thus p(1) will be the index of the food item with highest decision value). The method greedily selects items from p one at a time. After selecting a new item, it eliminates items that do not co-occur with the already selected items. It continues until the number of selected items is close to $m_{p(1)}$. While a calorie (or other nutritional information) estimate can be derived from this produced list of food items, it has been observed that performing regression directly from the feature space to total calories (or other nutritional information) provides a more accurate result. Consequently, in various embodiments, the Food Logger concatenates each of the base feature descriptors (one for each feature type) and uses Support Vector Regression (SVR) to learn the mapping.

Note that individual users may have multiple plates (e.g., bread plate, salad plate or bowl, primary food plate, etc.) in one or more meal images. In this case, the Food Logger can either recognize all plates or bowls in the meal images as belonging to the user, or the user can manually specify which plates are his for a particular recognition session.

2.4 Additional Embodiments and Considerations:

In view of the preceding discussion, it should be clear that the Food Logger can be implemented with a wide range of embodiments that include a variety of user interface options to interact with some or all of the functionality described herein. In view of these considerations, a few additional examples of some of the many embodiments and uses of the various features and capabilities of the Food Logger are described below. It should be understood that these examples are not intended to limit the scope of any of the capabilities or user interface embodiments of the Food Logger, and that such examples are only provided for purposes of explanation.

2.4.1 Constraining Recognition Based on Additional Factors:

As discussed above, in various embodiments, Food Logger constrains the meal image recognition question by first determining the restaurant or other location from which the image was captured. Other factors, including, but not limited to, time of day, food types known to be eaten by the user, etc., can also be used to constrain the recognition question. For example, in the case of time, if it is 8:00 AM, the user is more likely to be eating breakfast-type meals (e.g., bacon, eggs and toast) than potentially visually similar dinner-type meals (e.g., steak, pasta and rolls).

2.4.2 Identifying Portion Sizes:

In cases where restaurants serve similar meals in different portion sizes, those different portion sizes are often served on different plate, bowl, cup, or container sizes (e.g., a cup of clam chowder soup versus a bowl of clam chowder soup, or a side salad versus a full salad). However, in many images, a general scale problem exists where plate, bowl, or container size or distance from the camera may not be known.

There are several ways in which the Food Logger addresses such issues. For example, standard plate, bowl, or container sizes are often used by restaurants, e.g., a 6-inch plate for side salads and a 10-inch plate for full meals. Further, the meal models can also be trained on images on the different plate sizes used for particular restaurants, if that information is available.

In various embodiments, the Food Logger determines scale relative to known objects in the meal image. For example, for adults, hand size is generally close enough to allow the Food Logger to determine the difference between plate, cup, or container sizes when the user's hand is in the picture next to the food as a reference. Similarly, other objects (e.g., keys, phone, credit card, business card, eating utensils, etc.) in the meal image that are either recognizable (in terms of size) or that have been previously entered as a data point for model training can also be used as references to determine the difference between plate, cup, or container sizes. In other words, objects co-located with the food in the meal image and having a pre-defined or automatically determinable size are usable by the Food Logger as the basis to estimate plate, cup or container sizes and thus food volumes on the plate.

In related embodiments, the Food Logger uses a depth sensor (on phone, Kinect, other wearable or fixed sensors) to capture meal images. Consequently, given the resulting 3D information, the Food Logger uses various known imaging techniques to solve the scale question, and thus the volume question.

In cases where images of co-located objects or 3D information are not available with respect to the meal image, the Food Logger uses guided user interaction to allow the user to update or correct portion size. For example, in various embodiments, the Food Logger provides the user with an estimate of the portion size for a particular meal image. In the case that the estimate is incorrect, the user interface component of the Food Logger provides a widget (e.g., slider, radio buttons, numeric weight or volume entry fields, voice entry or selection, etc.) that allows the user to correct or specify portion size for some or all of the food items on the plate.

Similarly, where the Food Logger is unable to provide an estimate of portion size, the food logger can simply prompt the user to enter the portion size via the user interface, e.g., ask the user to select or enter some value (e.g., 8 ounce prime rib serving size or 16 ounce prime rib serving size). Note that the user interface can also be used to manually update information for a particular session or meal such as whether the user adds butter (or other food item, such as gravy, cream, sugar, etc.) and how much was added. Note also that with respect to such updates, the user can inform the Food Logger, via the user interface, how much they ate of the total portions (of entire plate or of individual items on the plate) instead of taking a picture of unfinished food on the plate.

2.4.3 Meals with Generic Food Items:

Meal images of some foods, such as, for example, burritos, are difficult to evaluate to determine calories or nutritional content since the food is wrapped up in a tortilla. For example, a generic image of a burrito could represent an image of a vegetable burrito with no cheese versus a pork carnitas burrito with extra cheese, guacamole and sour cream. While generic images of each of these burritos may look the same externally, especially when from the same restaurant, the nutritional content between them can vary considerably.

However, the Food Logger will recognize the fact that meal image is presenting a burrito. Further, the Food Logger can also use various automatic or manual means to determine what restaurant the user is at. In either case, the system can then automatically prompt the user with a question such as, for example, "what kind of burrito are you eating?" in combination with a list of known burrito types for the user to select from. This prompt can also include options for adding extra items (e.g., added cheese, extra sour cream, guacamole, salsa, etc.).

In other words, in any case where the Food Logger is not able to identify the exact food items with a sufficiently high probability, it can present some number of the top choices to the user and let the user then select the closest match, or to override the top choices and select from a wider range of options or manually enter nutrition data (which in any such cases can be used to update the model for future use).

Note that in the case of food items that generally come with specific sides (e.g., fajitas at Mexican restaurants typically come with a side of flour or corn tortillas), the Food Logger can recognize the fajitas. The Food Logger can then prompt the user to specify the number and types of tortillas eaten, and optionally whether they also ate tortilla chips and salsa, or consumed any beverages, while waiting for the main meal. Similarly, Chinese restaurants almost always provide a side of rice, which may be white, brown, fried, etc. In such cases the Food Logger will recognize Chinese food, and prompt the user to ask if rice was provided (and optionally what type) as a side dish (if not already recognized on the primary plate of the user or on one or more side plates or bowls associated with the user).

2.4.4 Personalization on a Per-User Basis:

As noted above, meal models can be trained on any of a number of datasets. Clearly, one such dataset can be home cooked meals for individual users. In such cases, the user interface of the Food Logger includes options to enter meal images and corresponding nutritional information for use in training or updating one or more of the meal models. Similarly, particular individuals, families, cultural groups, food types such as French food versus Chinese food, etc., can be the basis for training personalized meal models.

For example, individuals often tend to buy the same types of foods again and again over time for preparing meals at home, and to generally use the same the recipes and preparation methods to prepare that food. In such situations, a list or set of one or more of the meals prepared by the user at home can be used to generate labeled examples for training the meal model. Further, meal image capture can be accomplished in the home scenario using individual camera devices, as discussed above, or one or more cameras positioned to capture meal images. Examples of cameras configured for such purposes include, but are not limited to, in-home cameras positioned over the dining table or in the kitchen to image what is on the plate of individuals seated around the table, a Microsoft® Kinect® pointed towards one or more users eating while sitting on the couch, etc.

Advantageously, such cameras can also recognize each individual to keep track of what they eat, how many servings, how much they eat, when they eat, etc. This allows the Food Logger to perform a variety of per-person tasks. For example, these capabilities enable scenarios where any time a user receives a meal, the user's Kinect® or other camera, is used by the Food Logger to logs the event. The Food Logger can then log the user's caloric and nutritional intake automatically without requiring any input from the user. The Food Logger can then make any of a wide range of alerts or recommendations, e.g., "eat more fruit," "drink more water," "eat less sugar," "good job on your diet," "remember to take your medicine with dinner," etc.

Another personalization option provided by the Food Logger involves adapting to user behaviors over time. In other words, the Food Logger maintains some level of personalization of preferences on a per-user basis. For example, the Food Logger may know that when the user eats a baked potato, he typically adds cheese, butter, sour cream, bacon, etc. Such knowledge by the Food Logger is available either because the user has informed the Food Logger one or more times, or because the user took a picture of these items added on one or more occasions. Then, even if the user provides a meal image of a plain baked potato, the Food Logger can automatically include the additions, and then allow the user to update amounts or to add or remove one or more condiments to or from the baked potato.

Further, rather than just performing personalization on a per-user basis, in various embodiments, the Food Logger analyzes habits from groups of users (geographic groups, gender groups, demographic groups, etc.). This allows the Food Logger to categorize users for a variety of purposes. For example, individual users can be placed into percentile ranges for automated dietary messaging, e.g., "you eat less vegetables than 56% of other women from ages 25-35." Other examples include using such information to associate particular dietary habits to particular health problems or benefits, and make recommendations to the user in accordance with observed eating habits. For example, "you don't appear to have much calcium in your diet, and women in your age group tend to have increased instances of osteoporosis, so consider increasing your calcium intake." The Food Logger can then recommend sources of calcium to the user. Further, such recommendations can also include particular meals at local restaurants or restaurants that the user has gone to in the past.

2.4.5 Analytics and Alerts on a Per-User Basis:

Clearly, by monitoring user nutrition over time, the Food Logger can provide a wide range of messaging and alerts to the user. Further, when interfacing with exercise monitors or any of a wide range of medical devices (e.g., blood pressure devices, heart monitors, blood sugar monitors, etc.), the Food Logger can provide alerts or messages based on a combination of logged nutritional information and the state of various physiological parameters of the user. The following points provide a simple list of various examples of messaging and alerts based either on nutritional information alone, or on any combination of nutritional information and physiological parameters. Note that the following list is exemplary only, and is not intended to limit the scope of any embodiments of the Food Logger.

- Calorie count-based alerts, e.g., "you had a very health lunch today, but then you ate another 1000 calories of cookies and other snacks before dinner."
- Meal time alerts, e.g., "it looks like you are eating pizza at 11:30 PM, last time you ate pizza so late, you had heartburn."
- Habit-based alerts to send personalized ads to the user. For example, if the user sometimes gets pizza for lunch, ads or coupons for discounts on pizza at a restaurant near the user's current location can be sent to the user's device when lunch time is approaching.
- Analysis of the nutritional behavior of the user can be to send weight-watchers ads, gym membership ads, personal trainer ads, etc., to the user.
- If the user appears to eat organic food, ads for fresh organic food sources (e.g., markets, restaurants, etc.) can be sent to the user.
- If the user eats a particular type of food frequently, e.g., Indian food, either at home, at restaurants, or elsewhere, ads for a new Indian restaurant can be sent to the user, with such ads being optionally based on user or restaurant location.
- Sending ads for restaurants that have food typically eaten by the user based on reviews for that food, based on prices for that food, etc.
- Monitoring food intake for doctor/patient issues and medical records, discounts or increases in insurance rates based on diet, etc.
- Presenting warnings for dietary restrictions and food allergies, e.g., "you normally eat vegetarian, and this dish is known to have meat in it."
- In various embodiments, a medical condition component of the Food Logger considers known medical conditions for particular users to interact with such users on a number of levels. Examples of such interaction include, but are not limited to, presenting an immediate alert (e.g., any combination of audible, visible, tactile, automated phone calls, etc.) where the user has indicated, or when medical records available to the Food Logger indicate, that the user is allergic to shellfish (or nuts or any other specific food items) and the food in front of the user is recognized by the Food Logger as containing such items.
- Presenting exercise-based alerts, e.g., "you had apple pie with vanilla ice cream for dessert, you might consider walking an extra mile today."
- Estimating daily calorie intake in combination with inputs received from various sensors in devices carried, worn, or used by the user to estimate calories burned. The Food Logger can then prompt user, e.g., "based on your preset weight loss goals, you need to burn 500 calories based on what you ate today."
- Similarly, the Food Logger can provide estimates of how many calories were burned by a user during the day, and how many calories were consumed during the day and then tell the user how many more calories they can consume for dinner to meet their calorie goal for the day. The Food Logger can also suggest meals to order at specific restaurants meeting the calorie goals of the user.
- Monitoring user nutritional intake and user weight histories, with weight either being entered manually by the user or reported automatically to the Food Logger by an electronic scale or from other online records or sources. Providing various user interface elements to allow the user to interact with weight histories, e.g., setting or monitoring weight goals, meal planning based on meal image and nutritional information associated with one or more meal models, etc.
- Presenting good nutritional behavior messages or rewards, e.g., "you ate really well and exercised really hard for the last week, it's probably OK to reward yourself with a reasonable dessert with dinner tonight."
- Presenting color coded food choices to the user as an aid to maintaining a balanced diet (in view of logged nutritional behavior of the user). For example, food choices positively impacting the a balanced diet for the user can be color coded green, food choices not impacting the balanced diet can be color coded yellow, while food choices negatively impacting the balanced diet can be color coded red. Note that any desired colors, highlighting, explanatory text messaging, etc., can be used for such purposes.

2.4.6 Interaction with Medical Devices and Exercise Monitors:

As noted above, in various embodiments, the Food Logger includes a medical device component that interfaces with a wide range of exercise monitoring devices and other medical devices. User's may have implanted or wearable medical devices, or devices that measure or monitor particular statistics (e.g., blood sugar, blood pressure, heart rate, etc.). This allows the Food Logger to interact with the user relative to potential medical issues or concerns. However, it should be noted that recommendations or suggestions offered by the medical device component of the Food Logger are provided based on authorization, whenever required, by medical professionals in view of the nutritional information estimates relative to device readouts from any medical equipment in communication with the Food Logger.

For example, with respect to exercise monitoring devices or equipment worn by the user, the Food Logger can interface with such equipment to monitor caloric expenditures of the user throughout some period of time. The Food Logger can then match those caloric expenditures to caloric intake estimated from meal images of food consumed by the user during that period of time. The Food Logger can then perform a variety of actions, such as, for example, suggesting that the user perform additional exercise when excess calories are consumed, or, conversely, suggesting that the user may be allowed an extra snack based on an excess of calories burned.

Similarly, with respect to medical devices, such as a blood sugar monitor, for example, the Food Logger can interface with the medical device to monitor blood sugar levels relative to estimates of nutritional information of meals consumed by the user. A simple exemplary use of such information is that in the case of a diabetic user, the diabetes information can be logged to the medical condition component of the Food Logger. Then, if the Food Logger determines that a meal image corresponds to food having a high sugar content, such as a piece of cake for example, the Food Logger may suggest that the user carefully monitor her blood sugar levels. Similarly, the Food Logger may suggest that the user consider whether it is appropriate to take a prescribed medicine, such as insulin, based on a prior blood sugar spike measured following consumption of a similar piece of cake by the user. Conversely, in the case that the Food Logger determines, via the aforementioned blood sugar monitor, that the user's blood sugar levels have fallen below some threshold level, the Food Logger can suggest to the user that she consume some food, such as candy, juice, pie, etc., that will increase her blood sugar levels to a safer level.

The following points provide a simple list of various examples of messaging and alerts based either on nutritional information in combination with various medical sensors or devices. Note that the following list is exemplary only, and is not intended to limit the scope of any embodiments of the Food Logger.

- Presenting messages or alerts such as, e.g., "you have pie on your plate, and the last time you ate pie your blood sugar spiked 30 minutes later. Maybe you should consider taking your insulin." Again, such recommendations would typically be based on information or authorization provided by medical professionals. Similarly, again when authorized by medical professionals, in various embodiments, the Food Logger can also cause an embedded insulin pump to release insulin when the user is about to eat pie so as to help the user control blood sugar levels.
- Presenting messages or alerts to the user based on times that food was consumed, such as, e.g., "you haven't eaten for 8 hours, and the last time you waited 8 hours between meals, your blood sugar levels decreased to dangerous levels."
- Presenting messages to the user such as, e.g., "the last time you ate this particular food, your blood pressure increased. You may want to consider ordering a low-salt alternative." In various embodiments, the Food Logger then presents a list of such alternatives to the user.
- Recognize the food the user is about to eat, e.g., a very spicy chili, and suggest to the user that they may consider taking heartburn medication.
- Recognizing that the user is about to eat and remind the user that they are supposed to take a prescribed medicine with food.
- Monitoring user physiology (e.g., blood pressure, heart rate, respiration, etc.)

after consuming particular foods to determine whether user may be having an allergic reaction to one or more foods or ingredients in the foods being eaten.

2.4.7 Multi-Spectral Imaging of Meals:

Note that meal images processed by the Food Logger are not required to be typical visible light camera images, e.g., RGB or CMYK images. In fact, the meal images can be captured in any spectrum or color space desired. Examples of various spectrums that can be used by the Food Logger include, but are not limited to, IR images, UV images, terahertz images, multi-spectral images the visible spectrum or in any other spectrum or combinations of spectrums, etc. For example, terahertz scanning of food to recognize oil or fat content in food, or particular terahertz signatures of particular ingredients of food. Note that meal models used by the Food Logger are generally trained, at least in part, using the same color spaces and spectrums of the meal images subsequently presented for recognition.

Figure 2:
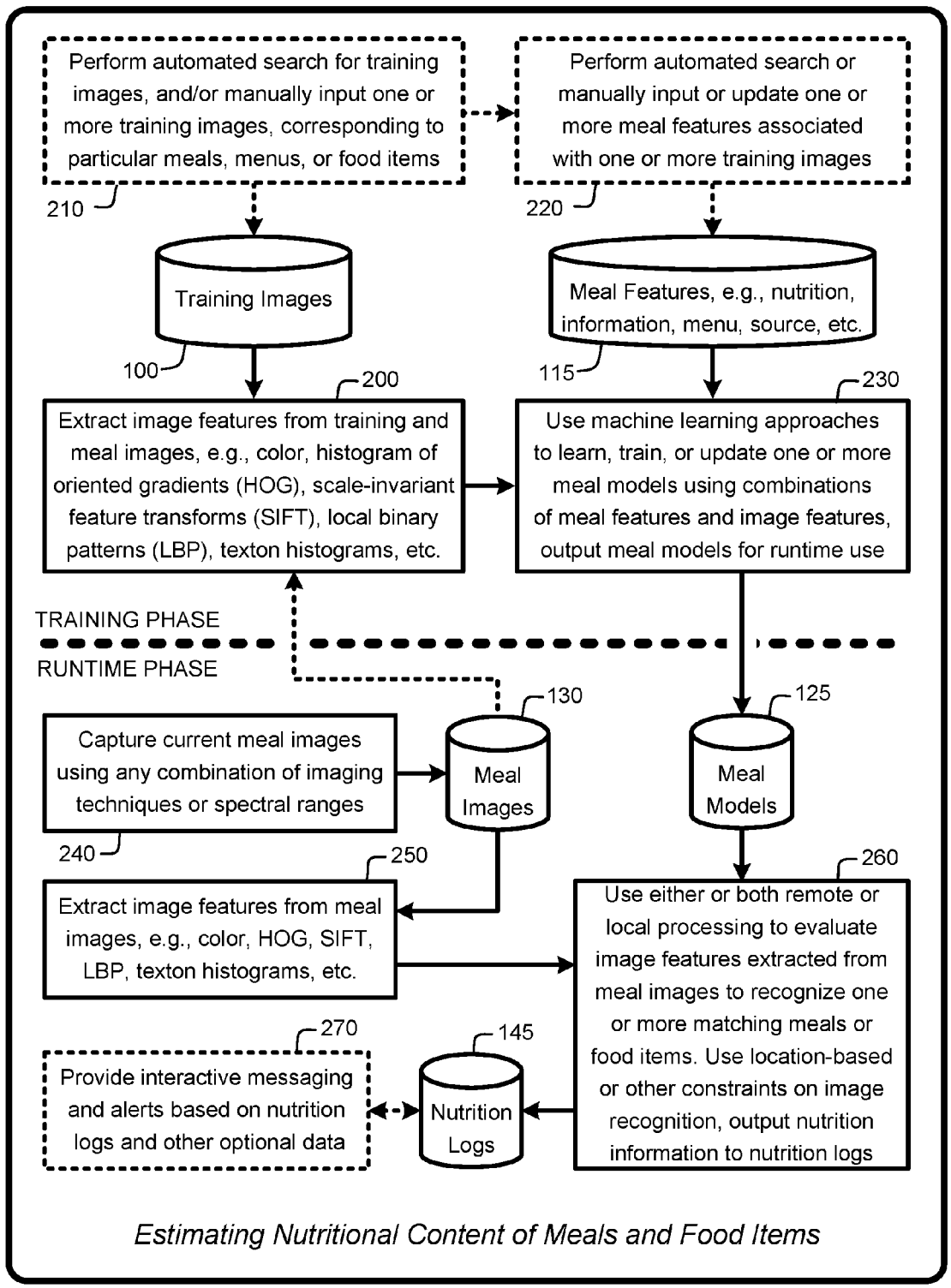
FIG. 2 illustrates a general system flow diagram that illustrates exemplary methods for implementing various embodiments of the Food Logger, as described herein.
Figure 3:
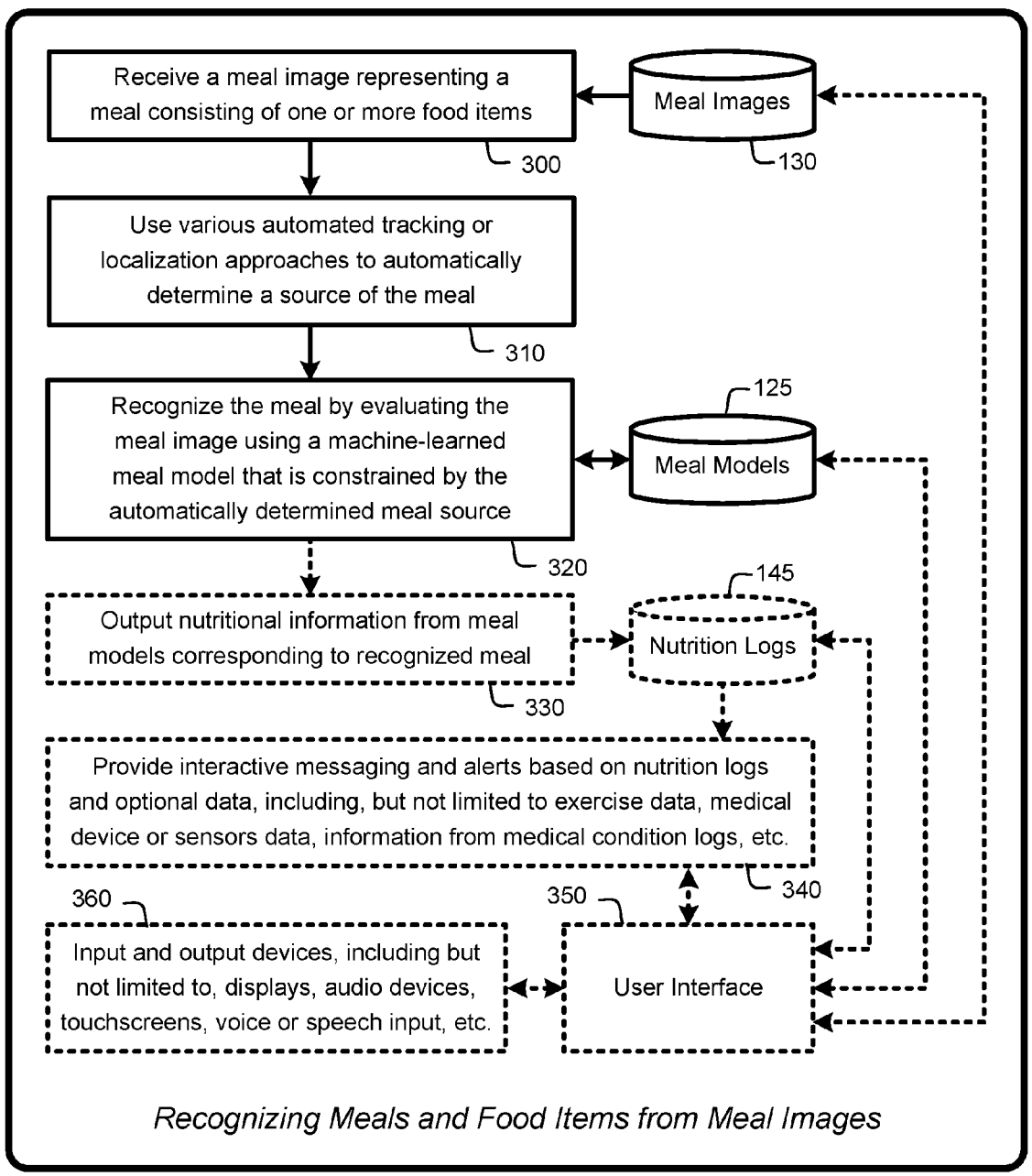
FIG. 3 illustrates a general system flow diagram that illustrates exemplary methods for recognizing meal and food items from food images, as described herein.

3.0 Operational Summary Of The Food Logger:

The processes described above with respect to FIG. 1, and in further view of the detailed description provided above in Sections 1 and 2, are illustrated by the general operational flow diagrams of FIG. 2 and FIG. 3. In particular, FIG. 2 and FIG. 3 provide exemplary operational flow diagrams that summarizes the operation of some of the various embodiments of the Food Logger. Note that the various processes illustrated by FIG. 2 and FIG. 3 are not intended to be an exhaustive representation of all of the various embodiments of the Food Logger described herein, and that the embodiments represented in FIG. 2 and FIG. 3 are provided only for purposes of explanation.

Further, it should be noted that any boxes and interconnections between boxes that are represented by broken or dashed lines in FIG. 2 or FIG. 3 represent optional or alternate embodiments of the Food Logger described herein, and that any or all of these optional or alternate embodiments, as described below, may be used in combination with other alternate embodiments that are described throughout this document.

In general, as illustrated by FIG. 2, the Food Logger begins a training phase of operation by extracting (200) a plurality of image features from training images 100, e.g., color, histogram of oriented gradients (HOG), scale-invariant feature transforms (SIFT), local binary patterns (LBP), texton histograms, etc. Note that as discussed above, in the case that one or more training images 100 are not available for a particular meal or food item, the Food Logger optionally performs an automated search (210) for training images corresponding to particular meals, menus, or food items. Note also that one or more such training images 100 can be provided via manual input or via manual selection from a set of existing images.

In addition, each of the training images includes one or more meal features (e.g., food type, meal contents, portion size, nutritional content (e.g., calories, vitamins, minerals, carbohydrates, protein, salt, etc.), food source (e.g., specific restaurants, grocery stores, particular pre-packaged foods, school meals, meals prepared at home, etc.). Note that in the case that one or more meal features 115 are not available for a corresponding training image 100, in various embodiments, the Food Logger optionally performs an automated search (220) for one or more meal features that are then associated with corresponding training images. Note also that one or more such meal features 115 can be provided via manual input or via manual selection from a set of pre-defined meal features.

Given the image features extracted from the training images 100 and the corresponding meal features 115, the Food Logger then uses various machine learning approaches (230) to learn, train, or update one or more meal models 125. The Food Logger then outputs one or more trained meal models 125 for runtime use in recognizing one or more current meal images 130. Note that these current meal images 130 are also used in various embodiments to update one or more of the meal models 125 by providing those meal images as new training images for use in updating one or more of the meal models using the machine learning approaches discussed throughout this document.

Once the meal models 125 have been trained, the Food Logger is ready to begin a runtime phase of operation. In general, during this runtime phase of operation, current meal images 130 are captured (240) using any combination of imaging techniques or spectral ranges, as discussed above. For example, a user can capture such meal images with a cellphone camera, meal images can be captured automatically via cameras embedded in eyeglasses or the like, meal images can be captured automatically by one or more cameras or imaging devices positioned to view meals relative to individual users, etc. Once the meal images have been captures, the Food Logger then extracts (250) image features from meal images, e.g., color, HOG, SIFT, LBP, texton histograms, etc. Note that this is basically the same image feature extraction process discussed above with respect to extracting image features from training images.

Given the image features extracted from current meal images 130 and the aforementioned meal models 125, the Food Logger then uses either or both remote or local processing (260) to evaluate those image features relative to the meal models in order to recognize one or more matching meals or food items. Further, as discussed above, in various embodiments, the Food Logger uses location-based or other constraints on recognition of meal images (e.g., limit search to meals available at one or more particular restaurants when the Food Logger determines that the user is in or near one or more particular restaurants. The Food Logger then uses the recognized meal image to output corresponding nutrition information from the meal models to nutrition logs 145. Finally, the Food Logger provides a wide range of interactive messaging (270) and alerts based on the nutrition logs 145 and other optional data (e.g., exercise data, medical device or sensor data, medical condition logs, etc.).

In general, as illustrated by FIG. 3, in various embodiments, recognition of meals and food items begins by receiving (300) a meal image 130 representing a meal consisting of one or more food items. The Food Logger then uses various automated tracking or localization (310) approaches to automatically determine a source of the meal (e.g., particular restaurants, schools, home, etc.). The Food Logger then recognizes (320) the meal by evaluating the meal image 130 using a machine learned meal model 125 that is constrained by the automatically determined meal source.

Once the meal has been recognized, the Food Logger then outputs (330) nutritional information from the meal model 125 that corresponds to the recognized meal. In various embodiments, this nutritional information is stored to nutritional logs 145 or the like. Given the nutritional information for recognized meals, the Food Logger then provides (340) various interactive messaging and alerts based on the nutrition logs 145 and optional data, including, but not limited to exercise data, medical device or sensor data, information from medical condition logs, etc. A user interface 350 is provided to interface with various functionality of the Food Logger, including, but not limited to the meal images 130, the meal models 125 the nutrition logs 145, etc. In general, the user interface uses any desired combination of one or more input and output devices (360), including, but not limited to, displays, audio devices, touchscreens, voice or speech input, real or virtual keyboards, cameras or imaging devices, etc.

Figure 4:
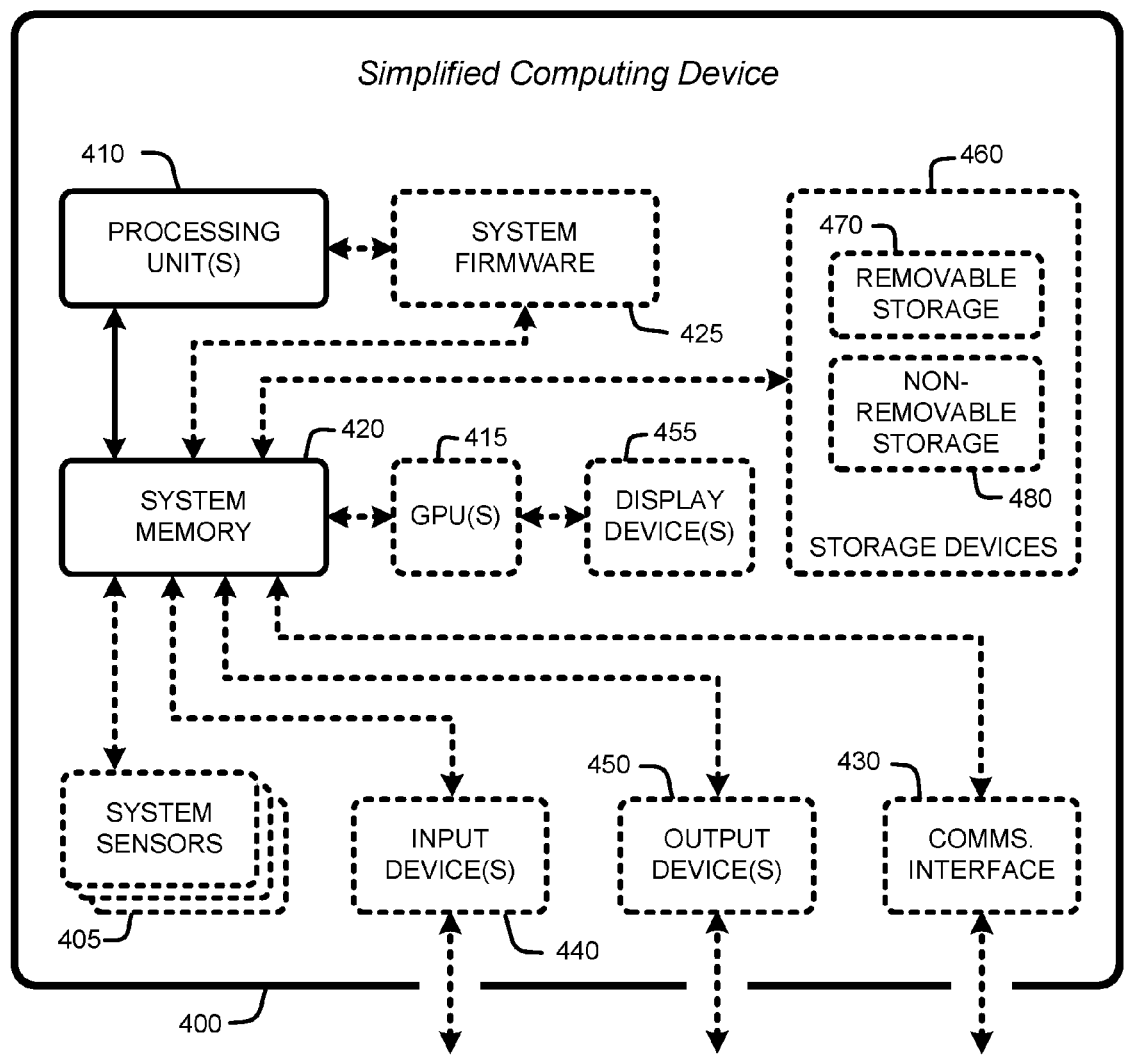
FIG. 4 is a general system diagram depicting a simplified general-purpose computing device having simplified computing and I/O capabilities for use in implementing various embodiments of the Food Logger, as described herein.

4.0 Exemplary Operating Environments:

The Food Logger described herein is operational within numerous types of general purpose or special purpose computing system environments or configurations. FIG. 4 illustrates a simplified example of a general-purpose computer system on which various embodiments and elements of the Food Logger, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 400. Examples of such devices operable with the Food Logger, include, but are not limited to, portable electronic devices, wearable computing devices, hand-held computing devices, laptop or mobile computers, communications devices such as cell phones, smartphones and PDA's, multiprocessor systems, microprocessor-based systems, set top boxes, programmable consumer electronics, network PCs, minicomputers, audio or video media players, handheld remote control devices, etc. Note also that the Food Logger may be implemented with any touchscreen or touch-sensitive surface that is in communication with, or otherwise coupled to, a wide range of electronic devices or objects.

To allow a device to implement the Food Logger, the computing device 400 should have a sufficient computational capability and system memory to enable basic computational operations. In addition, the computing device 400 may include one or more sensors 405, including, but not limited to, accelerometers, cameras, capacitive sensors, proximity sensors, microphones, multi-spectral sensors, etc. Further, the computing device 400 may also include optional system firmware 425 (or other firmware or processor accessible memory or storage) for use in implementing various embodiments of the Food Logger.

As illustrated by FIG. 4, the computational capability of computing device 400 is generally illustrated by one or more processing unit(s) 410, and may also include one or more GPUs 415, either or both in communication with system memory 420. Note that that the processing unit(s) 410 of the computing device 400 may be a specialized microprocessor, such as a DSP, a VLIW, or other micro-controller, or can be a conventional CPU having one or more processing cores, including specialized GPU-based cores in a multi-core CPU.

In addition, the simplified computing device 400 may also include other components, such as, for example, a communications interface 430. The simplified computing device 400 may also include one or more conventional computer input devices 440 or combinations of such devices (e.g., touchscreens, touch-sensitive surfaces, pointing devices, keyboards, audio input devices, voice or speech-based input and control devices, video input devices, haptic input devices, devices for receiving wired or wireless data transmissions, etc.). The simplified computing device 400 may also include other optional components, such as, for example, one or more conventional computer output devices 450 (e.g., display device(s) 455, audio output devices, video output devices, devices for transmitting wired or wireless data transmissions, etc.). Note that typical communications interfaces 430, input devices 440, output devices 450, and storage devices 460 for general-purpose computers are well known to those skilled in the art, and will not be described in detail herein.

The simplified computing device 400 may also include a variety of computer readable media. Computer readable media can be any available media that can be accessed via storage devices 460 and includes both volatile and nonvolatile media that is either removable 470 and/or non-removable 480, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Food Logger described herein, or portions thereof, may be stored, received, transmitted, or read from any desired combination of computer or machine readable media or storage devices and communication media in the form of computer executable instructions or other data structures.

Finally, the Food Logger described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Food Logger has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Food Logger. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process for evaluating images of meals, comprising:
   using a computer to perform process actions for:
   receiving a meal image of a single meal consisting of multiple food items;
   wherein one or more food items are visible and one or more of the food items are occluded in the meal image;
   receiving information indicating a source of the meal;
   recognizing one or more of the visible food items and one or more of the occluded food items in the meal by evaluating the meal image using a machine-learned meal model that is constrained by the source of the meal; and
   presenting one or more interactive messages automatically generated based on the recognized food items.

2. The computer-implemented process of claim 1 wherein the source of the meal is a particular restaurant.

3. The computer-implemented process of claim 1 further comprising process actions for using the meal model to estimate nutritional content of the recognized food items.

4. The computer-implemented process of claim 3 further comprising process actions for presenting one or more interactive messages automatically generated based on the nutritional content of the recognized food items.

5. The computer-implemented process of claim 3 further comprising process actions for storing the estimated nutritional content of the recognized food items to a database.

6. The computer-implemented process of claim 1 wherein one or more machine-learned meal model are trained using source-specific sets of meal images and corresponding nutritional information.

7. The computer-implemented process of claim 1 wherein one or more machine-learned meal model are trained using one or more meal images retrieved in response to an automated search for images at least partially matching text-based menu descriptions of corresponding meals.

8. The computer-implemented process of claim 1 wherein one or more machine-learned meal model are trained using nutritional information retrieved in response to an automated search for nutritional information corresponding to text-based menu descriptions of corresponding meals.

9. The computer-implemented process of claim 1 wherein a remote service is provided for recognizing the meal from one or more received meal images.

10. A system for recognizing meals, comprising:
    a general purpose computing device; and
    a computer program comprising program modules executable by the computing device, wherein the computing device is directed by the program modules of the computer program to:
    provide one or more machine-learned meal models trained on combinations of image features extracted from one or more sets of training images of representative meals and nutritional information corresponding to the representative meals;

acquire a single meal image in which one or more food items are visible and one or more other food items are occluded;

extract a plurality of image features from the meal image;

recognize the visible food items and one or more of the occluded food items by applying one or more of the machine-learned meal models to the image features extracted from the meal image;

generate one or more interactive messages in response to one or more of the recognized food items; and present one or more of the interactive messages via a user interface.

11. The system of claim 10 wherein one or more of the machine-learned meal models are further trained on one or more particular meal sources associated with one or more of the representative meals.

12. The system of claim 11 further comprising:
constraining one or more of the machine-learned meal models based on a source of the corresponding meals; and
applying one or more of the constrained meal models to the meal image to recognize the overall meal.

13. The system of claim 10 further comprising generating an estimate of nutritional information of the meal in response to recognition of the visible and occluded food items.

14. The system of claim 13 further comprising generating an automated alert in response to the estimated nutritional information, the automated alert including food ingredients to which a user may have an allergy.

15. A computer storage device having computer executable instructions stored therein for recognizing meals from images of those meals, said instructions causing a computing device to execute a method comprising:
receive a machine-learned meal model trained on combinations of one or more sets of training images of representative meals and sources associated with one or more of the representative meals;
acquire a single current meal image of a meal comprising a plurality of food items;
wherein one or more of the food items are visible in the current meal image and one or more other food items are fully occluded in the current meal image;
receive information representing a source of a meal corresponding to the current meal image;
recognize the visible food items and at least one of the occluded food items from the current meal image by evaluating the current meal image using the machine-learned meal model as constrained based on the source of the meal; and
present one or more interactive messages automatically generated based on the recognized visible food items and the recognized occluded food items.

16. The computer storage device of claim 15 further comprising instructions for applying the machine-learned meal model to estimate nutritional information associated with the recognized food items.

17. The computer storage device of claim 16 further comprising instructions for presenting one or more interactive messages automatically generated based on the estimated nutritional information.

18. The computer storage device of claim 16 further comprising generating an automated alert in response to estimated nutritional information including food ingredients to which a user may have an allergy.

19. The computer storage device of claim 15 wherein one or more of the training images of representative meals are obtained response to an automated search for images at least partially matching text-based descriptions of corresponding meals.

20. The computer storage device of claim 15 wherein a remote service is applied to recognize the visible and occluded food items in the current meal image.

* * * * *